(12) United States Patent
Galai et al.

(10) Patent No.: US 7,263,504 B2
(45) Date of Patent: Aug. 28, 2007

(54) DIVERSIFICATION OF RISK FOR ARTISTS AND INVESTORS

(75) Inventors: Dan Galai, Jerusalem (IL); Mordokhi Shniberg, Elkana (IL)

(73) Assignee: MutualArt Inc., New York, NY (US)

( * ) Notice: Subject to any disclaimer, the term of this patent is extended or adjusted under 35 U.S.C. 154(b) by 186 days.

(21) Appl. No.: 10/753,131

(22) Filed: Jan. 7, 2004

(65) Prior Publication Data

US 2004/0143530 A1   Jul. 22, 2004

Related U.S. Application Data

(60) Provisional application No. 60/438,513, filed on Jan. 8, 2003.

(51) Int. Cl.
*G06Q 40/00* (2006.01)
(52) U.S. Cl. ..................... 705/36 R; 705/35
(58) Field of Classification Search ............ 705/35, 705/36, 37, 36 R
See application file for complete search history.

(56) References Cited

U.S. PATENT DOCUMENTS 6,792,411 B1 * 9/2004 Massey, Jr. ............ 705/35

7,062,457 B1 * 6/2006 Kaufman .............. 705/35
2002/0156709 A1 * 10/2002 Andrus et al.
2004/0015427 A1 * 1/2004 Camelio

FOREIGN PATENT DOCUMENTS

WO    2005072278    *   8/2005

OTHER PUBLICATIONS

U.S. Appl. No. 60/394,974.*
Mei, Jeianping and Moses, Michael; "Art as an Investment and the Underperformance of Masterpieces", The American Economic Review, Nashville: Dec. 2002, vol. 92, Issue 5, p. 1656, 13 pages.*

* cited by examiner

*Primary Examiner*—Lalita M. Hamilton
(74) *Attorney, Agent, or Firm*—Fish & Richardson P.C.

(57) ABSTRACT

A business model for the diversification of risk in connection with works of art includes accepting from various artists works of art to be pooled in a collective investment fund. A financial instrument is issued to each particular artist in consideration for one or more works of art contributed by that artist to the fund. Revenues are generated on behalf of the fund through commercialization of the works of art in the fund. A portion of the revenues is distributed among the artists participating in the fund according to vested interests in the financial instruments held by the artists. A particular artist having a vested interest in one of the financial instruments is entitled to receive an amount of the revenues based on the collective commercial success of the works of art contributed to the fund by all the artists.

26 Claims, 6 Drawing Sheets

DIVERSIFICATION OF RISK FOR ARTISTS AND INVESTORS

CROSS-REFERENCE TO RELATED APPLICATION(S)

This disclosure claims the benefit of priority of U.S. Provisional Patent Application No. 60/438,513, filed Jan. 8, 2003, which is incorporated herein by reference.

BACKGROUND

The present disclosure generally relates to financial engineering, and specifically to the diversification of risk related to the creation of works of art and investment in works of art.

The art business in general and the visual art business in particular are proving to be an economically sound, high-profit business even in tense economic climates. Lead by individual and corporate investors, auction houses, collectors, Wall Street cash funds and art dealers, investment in works of visual art has maintained above-average returns and is recognized as a high-performance investment. As such, it has attracted new types of investors, such as commercial corporations (albeit preferential tax treatment and non-disclosure regulations can also be recognized as a contributing factor).

Although works of visual art, as a viable commodity, have developed considerably over the years, an evident lack of sophisticated business development is apparent on the part of the artists creating the works of art. While investors have developed "art portfolios" and art-works investment strategies, contemporary artists continue to struggle to draw attention to their works of art, seeking the financial support of and promotion from benefactors, art-cognoscenti, collectors and gallery owners. Although investors are able to reduce their risk by investing in a diverse art portfolio, artists bear the full risk of their own personal success. The present disclosure attempts to address those issues to enable the diversification of risk incurred by the creation of visual art by individual artists.

SUMMARY

The present disclosure relates to a business model that allows an individual artist to diversify her risk by pooling her artistic creations with other artists' works of art. The artist may reduce the risk of failure because the amount of her share in revenues from the works of art does not depend solely on the commercial success of the particular works of art contributed by her, but rather on the likelihood that collectively, the works of art in the pool will be successfully commercialized. The present techniques, therefore, combine advantages of a captive mutual insurance strategy together with advantages of a venture capital strategy for the overall benefit of both individual artists and investors. From the perspective of investors, the techniques can allow non-sophisticated investors to invest in contemporary, young or unfamiliar artists with the assistance of professional art, business and financial experts at low transaction costs.

Diversification may be achieved by pooling works of art through the establishment of a mutual art fund and the creation of a financial instrument linked to the art fund. The pool of works of art are exploited to obtain excess yield to be distributed as an annuity or a dividend. Artists may thereby reduce their exposure to occupational risks, and investors may secure higher yields at lower risk.

The financial viability of works of art may be converted into an independent financial instrument that results in the conversion of potential gains from the liquidation and commercialization of the works of art into variable annuities or other forms of yield. In addition, a system for the disbursement of the yield is disclosed.

In one aspect, a method for the diversification of risk in connection with works of art includes accepting from each artist one or more works of art to be pooled in a collective investment fund. A financial instrument is issued to each particular artist in consideration for one or more works of art contributed by that artist to the fund. Revenues are generated on behalf of the fund through commercialization of the works of art in the fund. A portion of the revenues is distributed among the artists participating in the fund according to vested interests in the financial instruments held by the artists. A particular artist having a vested interest in one of the financial instruments is entitled to receive an amount of the revenues based on the collective commercial success of the works of art contributed to the fund by all the artists.

In another aspect, a system for distributing revenues in connection with works of art includes databases and a computer system coupled to the database(s). The databases store information about the artists, the works of art that are pooled in the collective investment fund, financial instruments issued to each of the artists in consideration for the works of art contributed by the artists to the fund, and revenues obtained on behalf of the fund through commercialization of the works of art in the fund. The information may be stored in a single database or multiple databases. The computer system is adapted to cause the distribution of a portion of the revenues among the artists participating in the fund.

In various implementations, one or more of the following features may be included. For example, works of art for the fund may be received from each artist according to a predetermined schedule. The works of art may include visual or other types of works of art. Each work of art may be reviewed by a committee to determine whether the work of art should be accepted into the fund. Ownership of the works of art may be transferred to an entity that manages the fund.

In some implementations, each financial instrument may comprise an equity instrument that entitles the artist to a specified portion of future revenues distributed by the fund. In some cases, distribution of revenue to the artists begins only after a specified period since the fund opened.

Each financial instrument may comprise, for example, a warrant that may be exercised by the particular artist after a specified vesting period. In some implementations, the warrant may be exercised by the particular artist after the vesting period only if the artist is still participating in the fund. An artist may be deemed to still be participating in the fund only if the artist has contributed works of art to the fund according to a specified schedule. Upon exercising the warrant, the artist would be entitled to a specified portion of future revenues distributed by the fund.

In some implementations, a particular artist having a vested interest in one of the financial instruments also may be entitled to receive an amount of the revenues based on the commercial success of the works of art contributed to the fund by that particular artist. Therefore, a portion of the revenue that an artist receives may be based on the combined, collective commercial success of all the artists' artworks, whereas another portion may be based on the commercial success of the individual artist.

In addition to the financial instruments issued to the artists in consideration for the works of art contributed by them to the fund, financial instruments representing shares in the fund may be issued to other entities as well. Each share entitles the entity owning the financial instrument to a specified amount of future revenue generated by the fund.

One or more of the following advantages may be present in carious implementations. Some advantages include enabling artists to reduce the need for long-term and industrious efforts on their part to promote or commercialize their works of art, providing access to professional management to help promote the works of art, and enabling the artists to obtain immediate funds, for example, by selling or trading the financial instruments issued to them by the holding corporation. When long term commitments are incorporated into the agreement between the parties and reflected in the financial instruments issued by the funds to the participating artists, certain taxation benefits also may be obtained in accordance with contemporary regulation, such as recognition of the funds as pension funds.

An individual artist can receive annuities, dividends or other forms of consideration for his works of art in a manner that is independent of the commercial success of the artworks created and contributed by him. Without the present techniques, artists contributing works of art would be required to incur high supervision fees to ensure the correct allocation of the revenues among participants.

By applying a computer-based system to determine the amount of revenue that each artist is entitled to receive from the fund, fewer personnel may be required, thereby allowing for the reduction of labor costs. Employing a reliable system which causes the automatic disbursement of revenues in accordance with the terms of the financial instruments also may result in a more efficient diversification of risk by enabling a greater number of participants to join the enterprise at lower administrative costs.

Valuation of the financial instrument may be determined on the basis of the revenues obtainable by employing the works of art, and not merely on their sale value. Furthermore, the valuation of securities in the fund may serve as a financial index by which to determine the value of other art-works, even those not owned, managed or held by the funds.

Other features and advantages will be readily apparent from the following detailed description, the accompanying drawings, and the claims.

DETAILED DESCRIPTION OF PREFERRED EMBODIMENTS

Figure 1:
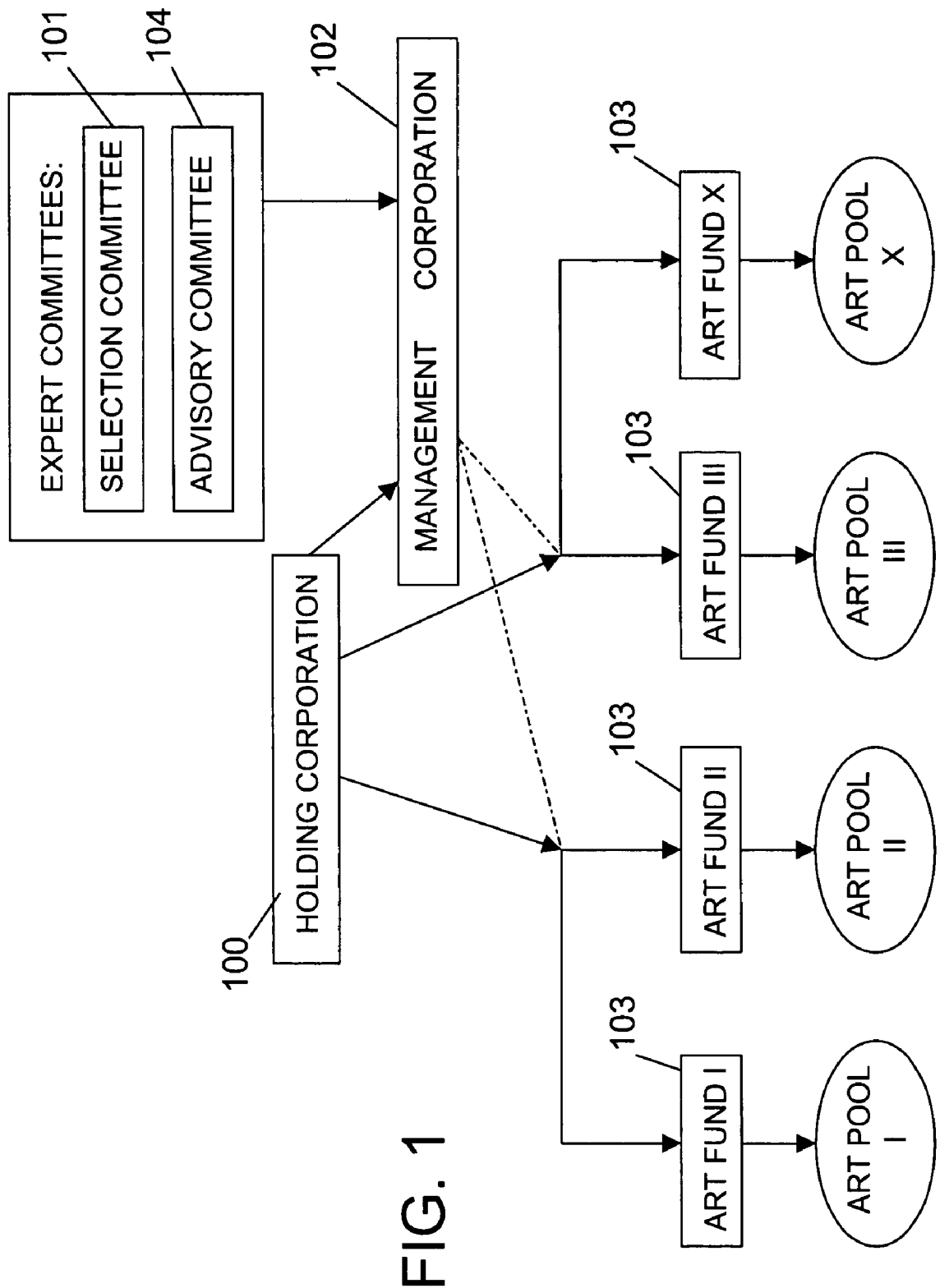
FIG. 1 illustrates an example of the structure of an enterprise through which artists may diversify risk in works of art according to the invention.

FIG. 1 illustrates an example of the structure of an enterprise through which artists may diversify risk in works of art. In this disclosure, the phrase "works of art" includes, but is not limited to, visual arts including paintings, sculptures, photographs, videos, films and collectibles.

As shown in FIG. 1, the enterprise may include (a) a management corporation 102 including expert committees such as a selection committee 101 and an advisory committee 104; (b) one or more funds 103 in which works of art are pooled; and (c) a holding corporation 100.

Artists may file an application with the management corporation 102 for the purpose of participating in an investment program. In some cases, the selection committee may extend an invitation to an artist to participate in the program. The selection committee 101 examines the application in accordance with predetermined guidelines. Once an applicant is approved, the holding corporation 100, the management corporation 102 and the applicant enter into an agreement pursuant to which the applicant agrees to contribute a specified number of works of art over a certain period to one or more of the funds 103. The artist receives from the fund(s) 103, in consideration for each contributed work of art, one or more financial instruments. The number and type of the financial instruments may be based on an appraisal of the contributed work of art as determined by the selection committee 101.

The funds 103 may comprise a single corporation or group of legal entities in which the holding corporation 100 holds one hundred percent of all substantial claims (i.e., stock, bonds, substantial loans, derivative securities, etc.). Alternatively, the funds 103 may be jointly held by the management corporation 102 and the holding corporation 100 at predetermined holding percentages. The existence of the funds 103 may be limited in time to ensure liquidation of all the artworks after a predetermined period.

The financial instrument given to the applicant entitles the applicant to receive an annuity or other form of payment. The types of financial instruments issued may vary depending on the date of the contribution by the participating artist receiving the financial instrument. The recipient of the financial instrument may be entitled to transfer, sell, lease, securitize, lien, or mortgage the financial instrument and any rights available to the holder of the financial instrument.

Upon contribution of a work of art, the management corporation 102 may engage, on behalf of the corresponding fund 103, in the commercialization of the work of art. Commercialization may include the sale or lease of the work of art, as well as various other uses of the work of art. The fund may sell, for example, some of the artworks through auction houses, galleries, art dealers and collectors. Other works of art may be leased to corporations. Lots of large numbers of artworks may be sold or leased to various institutions. The fund may prepare and sell catalogues or books based on the works of art. In addition, the fund may issue notes or stocks that allow third-parties to participate in the fund's net liquidation value. The advisory committee 104 may instruct, supervise or determine how particular works of art are to be commercialized to increase the overall value of the fund.

Figure 2:
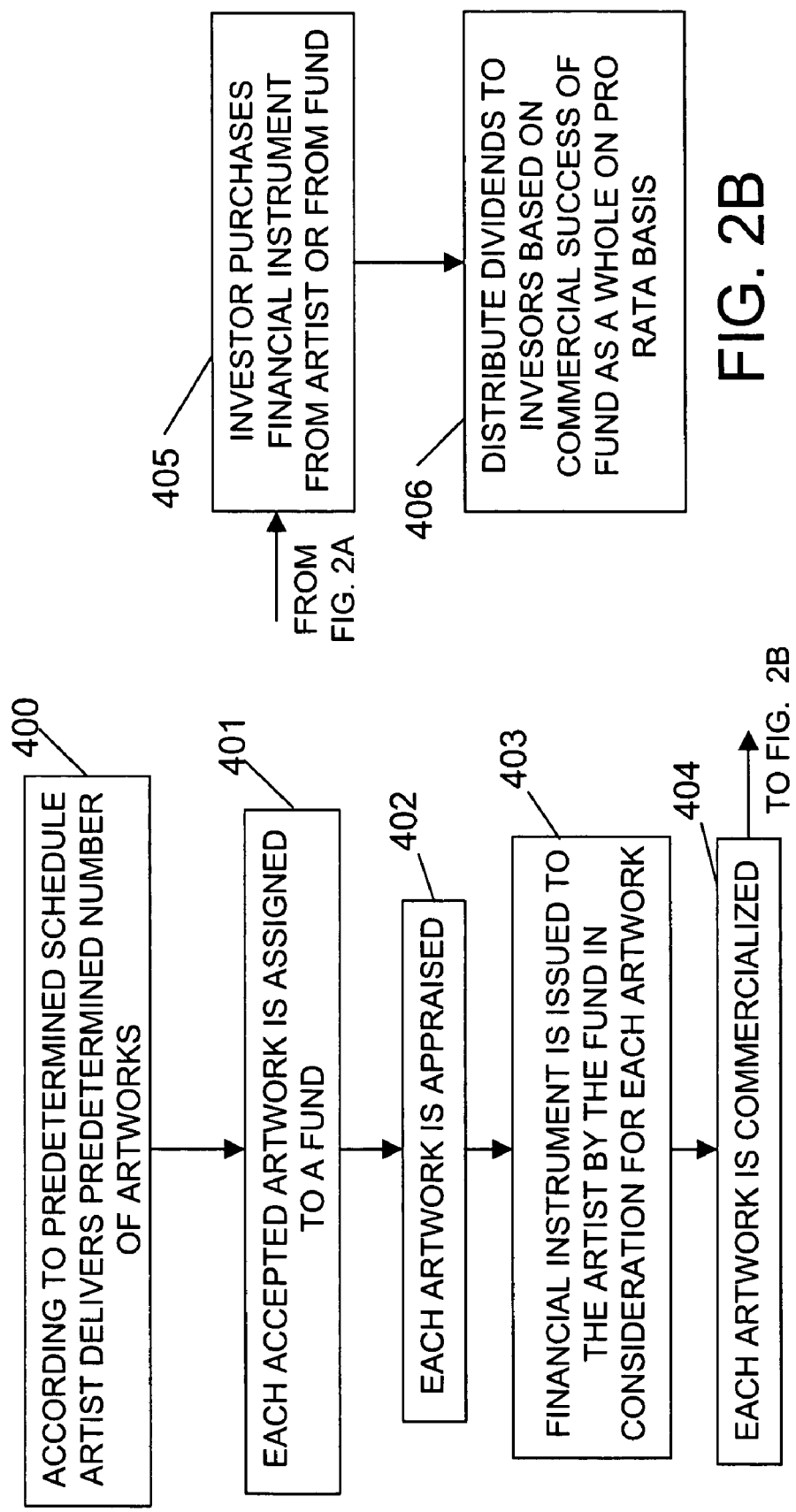
FIG. 2 is a flow chart illustrating an example of the overall process through which artists may diversify their risk in works of art according to the invention.

FIG. 2 illustrates a flow chart of a method that allows artists to diversify their risk. As discussed below, the method may include selecting artists, assembling a pool of artworks, disbursing revenues and trading in financial instruments.

Initially, the legal entities are created, teams of professionals are recruited, and operational guidelines are implemented. Artists are selected to participate in the program and to deliver, according to a predetermined schedule, a specified number of artworks (block 400).

Preferably, the selection committee 101 (FIG. 1) performs its artworks selection duties in accordance with predetermined guidelines. The selection committee may reserve the right to decline to accept a work of art contributed by an artist in accordance with predetermined guidelines and to bring into effect termination clauses or other sanctions against an artist who fails to comply with the terms of the program.

The artists selected to participate in a particular fund form a pool of artists. Each work of art submitted by a participating artist is catalogued, and either approved for acceptance, or rejected. Each accepted artwork is assigned to a particular fund based, for example, on the type and style of artwork (block 401).

Each work of art accepted into the fund is appraised (block 402). In consideration for each artwork (or group of artworks) delivered by the artist and accepted by the fund, a financial instrument is issued by the fund to the artist (block 403). The financial instrument entitles the artist to a portion of the disbursable revenues obtained from the pool of artworks in the particular fund. The type and number of financial instruments issued to the artist in consideration for each artwork may be based, for example, on an appraisal of the artworks by the fund or on its behalf. In general, the participating artists may not be equal in skill or stature, nor will each work of art have the same initial potential for commercial success. Proper appraisal of the artworks is, therefore, important to attracting artists with good potential for success.

An artist who receives a financial instrument from the fund in exchange for contributing one or more artworks may be entitled to transfer, sell, lease, securitize, lien, or mortgage the financial instrument and any rights available to the holder of the financial instrument.

After accepting a work of art contributed by an artist, the management corporation 102 engages in the commercialization of the work of art to generate revenues on behalf of the corresponding fund 103 (block 404). Commercialization may include, for example, the sale or lease of the work of art, as well as various other uses of the work of art. The advisory committee 104 may instruct, supervise or determine how particular works of art are to be commercialized to increase the overall value of the fund.

An artist may chose to liquidate his holdings in the fund by selling the financial instrument(s) to a third-party (block 405). In addition, third-parties may chose to invest in the fund in return for holdings therein by purchasing financial instruments from the fund. The price to be paid for the financial instrument may be agreed upon as in any market of voluntary sellers and buyers.

As revenues are obtained by the fund through commercialization of the artworks in the pool, dividends may be disbursed by the fund among holders of financial instruments either on a pro rata or other basis (block 406). In general, an artist who holds one or more financial instruments may be entitled to a dividend in an amount that is not linked specifically to the artworks that he contributed or for which he received the financial instrument. Instead, the amount of the dividend is based on revenues obtained by the fund from the successful commercialization of the entire pool of artworks in the fund. Therefore, an artist who contributed artworks to the fund, but whose artworks turned out to be commercially unsuccessful, would still be entitled to a dividend.

In addition to receiving an amount of the revenues based on the collective commercial success of the works of art contributed to the fund by all the artists, in some implementations, each particular artist also may receive an amount that is based on the commercial success of the artworks contributed to the fund by the particular artist.

For example, in one implementation, 20% of the net revenue obtained from the commercialization of the artworks in the fund would be used for the fund itself. The remaining 80% would be used for the future revenue payments to eligible artists participating in the fund (or to a third-party who holds a financial instrument transferred from a participating artist). Half of the future revenue payments, for example, may be allocated for distribution to the artists in amounts that are based on the collective commercial success of the artworks in the fund so that each participating artist would receive an amount that is independent of the commercial success of the particular artworks he contributed to the fund. The other half of the future revenue payments may be allocated to the artists in a manner such that the amount distributed to a particular artist depends on the commercial success of that artist's artworks. The specific percentage allocations mentioned above may differ in other implementations.

Several advantages may be obtained from the foregoing techniques. First, whereas in contemporary practice artists rely on their own individual merits to succeed, by pooling their artworks the artists may diversify their risk of failure. If a particular artist's artworks turn out to be commercially unsuccessful, the artist still may obtain benefits from the success of the other artists' artworks pooled in the fund. As noted above, as least some of the dividends disbursed among holders of the financial instruments are linked to the combined success in commercializing the pool of artworks in the fund, instead of being linked to the individual artist's artworks.

Second, allowing an artist to sell his financial instrument to a third-party may be important to those artists who do not wish to participate in a long-term investment.

Third, the business model described above enables third-parties to become involved by purchasing financial instruments from the artists or from the fund.

The business model may be particularly useful when a large number of artists enter the program and when trade in the financial instruments is widespread. Under such circumstances, a market price for the financial instruments can be determined by investors, leading to a situation in which the allocation of artworks among different funds is indicative of a certain class of artworks (such as modern art, surrealistic art, etc.). An index can be created so that works of art, even those not included in a pool of any of the funds, may be valuated.

Figure 3:
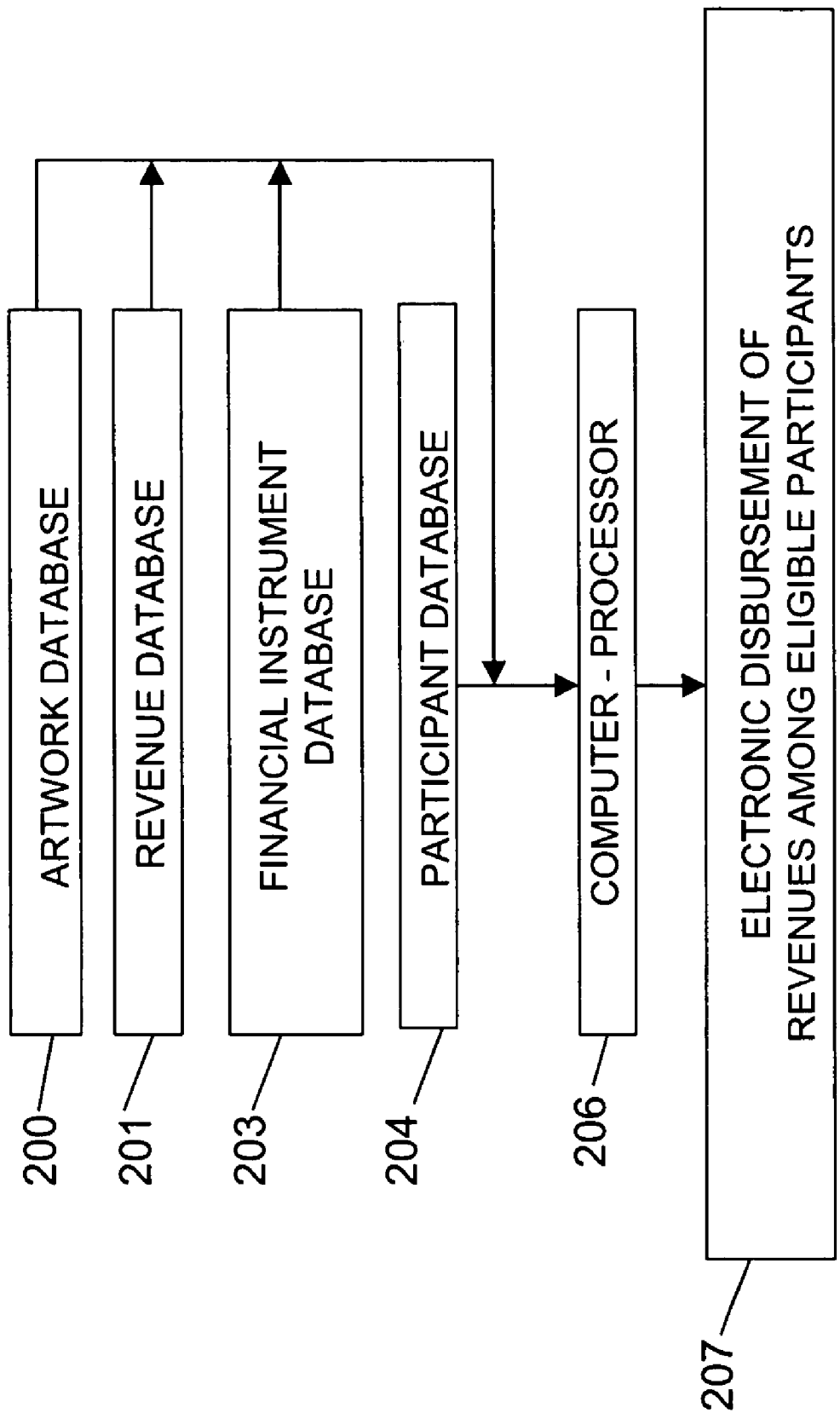
FIG. 3 illustrates an example of a system for the disbursement of revenues to which participating artists are entitled.

FIG. 3 illustrates an example of a system for the disbursement of revenues to which participating artists are entitled based on the financial instruments issued to them in exchange for their contributing works of art. The revenues are derived from the collective set of works of art contributed by the participating artists. The system can be configured to convert the value of the works of art contributed to each fund among the participating artists.

As shown in FIG. 3, the system includes a first artwork database 200 to store information regarding each contributed work of art. The stored information may include (a) the name of the contributing artist; (b) the appraisal value of the artwork; (c) the date of creation of the artwork; (d) the type of artwork; (e) the date of the artwork's contribution; and (f) an index code for the artwork. Other information also may be stored in the database 200.

The system also includes a second revenues database 201 to store information regarding the revenues derived from the commercialization of each contributed work of art. The information may include (a) an index code for each artwork; (b) the techniques used to commercialize each artwork to produce revenue; (c) the amount of revenues obtained from commercializing each artwork; and (d) costs and expenses incurred in commercializing each artwork.

The system also includes a third financial instrument database 203 to store detailed information regarding the types of financial instruments held by the participating artists and the rights each financial instrument confers upon its holder. A fourth participant database 204 stores personal information for each participating artist, as well as the number and type of financial instruments in which the artist has tenure and to which he is entitled.

The various databases 200, 201, 203, 204 may be provided either as separate databases or a single database. Therefore, references to first, second, third and fourth databases are for convenience only and may, in some implementations, comprise a single database that stores the relevant information.

A machine, such as a computer system or processor 206, is coupled to the databases 200, 201, 203, 204, and is adapted to calculate the payable portion of each participant based on the number and type of financial instruments in which he has tenure or to which he is entitled. An electronic means 207 is coupled to the computer 206 to cause the disbursement of revenues among the participating artists. The electronic means 207 may include, for example, communication links to banks or other financial institutions where the participants have accounts. The electronic means 207 provides for the automated transfer of funds.

Figure 4:
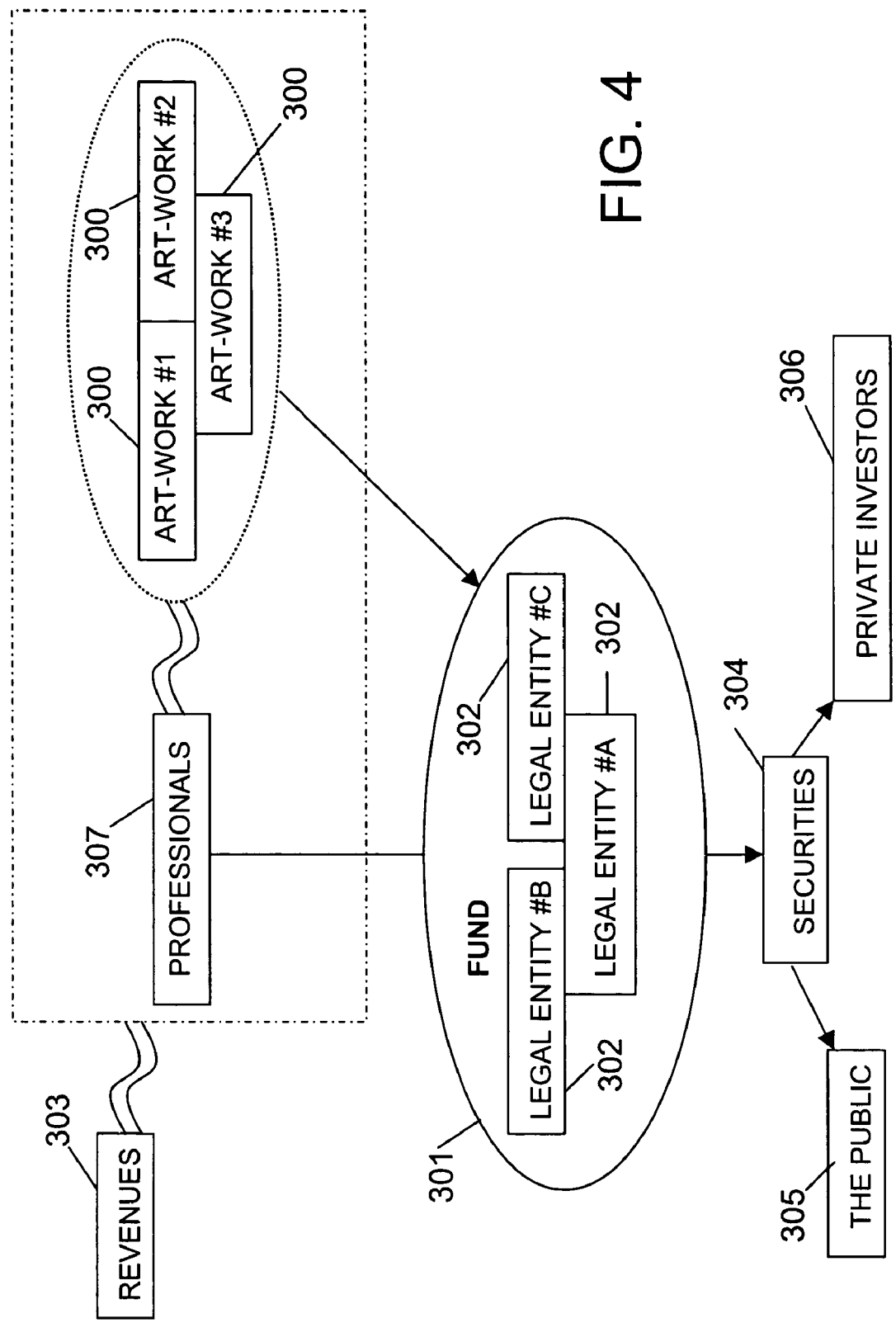
FIG. 4 illustrates an example of a method for converting the value of a work of art into an independent financial instrument.

FIG. 4 illustrates an example of a method for converting the value of a work of art into an independent financial instrument that entitles the holder of the instrument to a yield based on the revenues derived from the works of art in the pool associated with the fund.

As explained above, when a work of art contributed by a participating artist is accepted, ownership in the work of art 300 is transferred to a fund 301 that comprises one or more legal entities 302, such as a partnership, a limited liability company, or any other legal entity or combination of legal entities. The fund 301 employs the works of art 300 for the purpose of creating revenues 303 and concurrently offers securities 304 to the public 305 or to private investors or corporations 306. Professionals associated with the fund 301 can help facilitate the commercialization of the works of art 300.

The securities 304 may include, for example, either stock or bonds (or derivatives of stocks or bonds) of the legal entities which comprise the fund 301. Holders of the securities 304 are entitled to a predetermined dividend or interest that is linked to the revenues 303 obtained from the works of art 300, thus creating a future flow of cash to the holders of the securities 304.

Trade in the securities 304 need not be indefinitely or completely limited by the fund or legal regulations. For example, initially, the securities 304 may be offered at a price based on the appraised value of the assets of the fund 301, that is, at the combined value of the works of art 300 at the time of their transfer to the fund 301. Modern methods for valuating securities and corporations may be based on the future cash flow of the valuated asset. In this case, the future cash flow is based on the collective sale value of each of the works of art 300 at any particular time and the expected payments linked to revenues obtained from the works of art. Trade in the securities 304 is, therefore, analogous to trading in the value and financial viability of the works of art, thereby effectively converting the works of art into a financial instrument.

Figure 5:
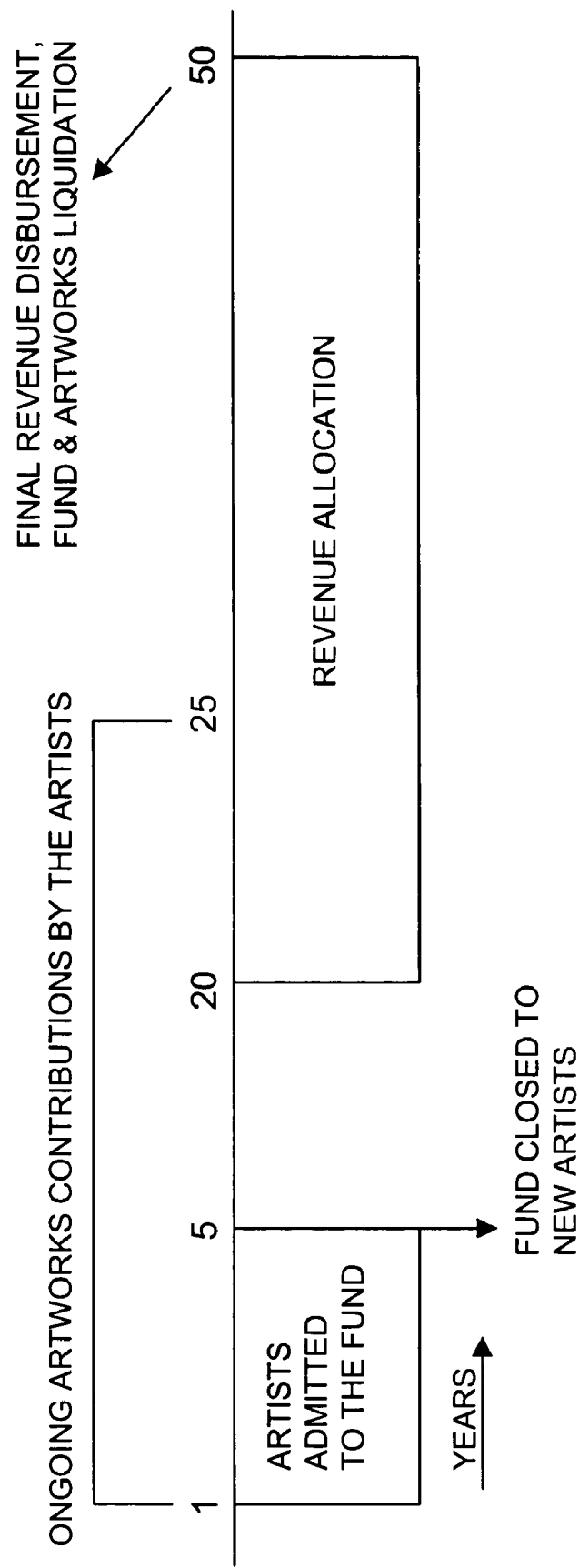
FIG. 5 illustrates a timeline for a particular implementation of a fund's operations.

FIG. 5 illustrates a specific example in which the lifetime of the fund is set to fifty years. In this particular example, artists may be admitted to the fund during an initial five-year period. After the first five years, the fund is closed to the admission of additional artists. According to one implementation, following her admission to the fund, each artist is obligated to contribute a specified number of works of art according to a specified schedule.

For example, during years one through five following the artist's admission to the fund, the artist may be required to contribute two works of art per year. During years six through ten following admission to the fund, the artist may be required to contribute one work of art each year. Similarly, during years eleven through twenty following admission to the fund, the artist may be required to contribute one work every two years. According to that particular schedule, each artist would contribute at least twenty works of art over the course of a twenty-year period. Depending on when the various artists were admitted to the fund, they would continue to contribute works of art at least through year twenty and, in some cases, through year twenty-five. Therefore, an artist who was admitted later in the admission period would be required to contribute artworks later into the lifetime of the fund.

In a particular implementation, the financial instrument given to the artist upon acceptance of a work of art by the fund may include an equity instrument. The equity instrument may represent a residual interest in the assets of the fund after deducting its liabilities. In some implementations, the equity instrument includes a warrant. The warrant may be exercised, for example, at a predetermined cost of $0.01, and each exercised warrant entitles the artist to receive a preferred share of a particular class of the fund's stock. Preferably, the warrants have a vesting period, such as five years, during which the artist must continue to satisfy her obligations under the program. Failure to complete the five-year term would result in expiration of any unvested warrants.

Figure 6:
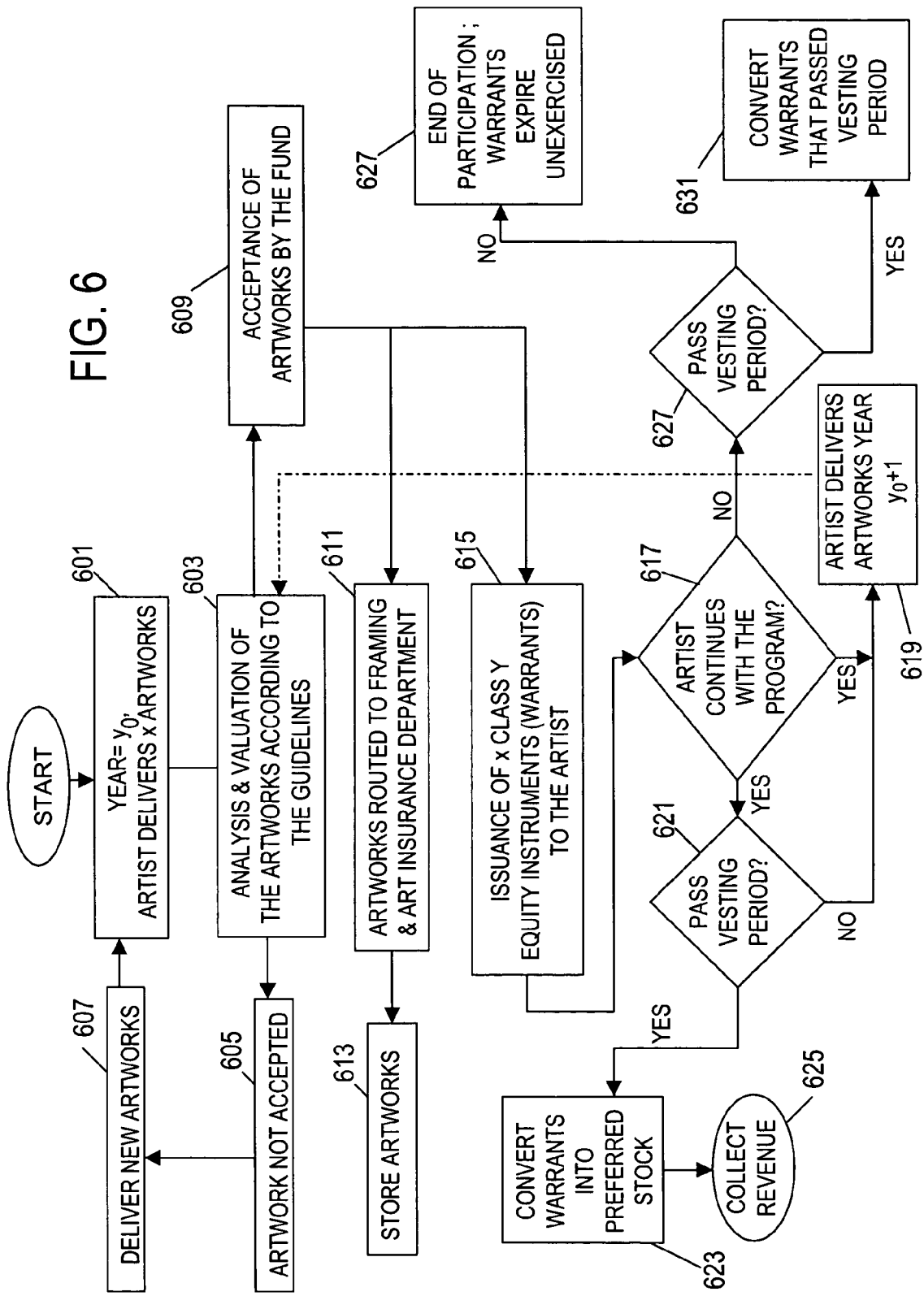
FIG. 6 illustrates a flowchart of a method relating to issuance of financial instruments by the fund.

FIG. 6 illustrates a flow chart of a method that may be used for issuance of equity instruments to the artists participating in the fund. In a particular year ($y_0$), an artist delivers a certain number (x) of artworks to the fund (block 601). A committee associated with the fund analyzes and values the artworks according to specified guidelines (block 603). If a work of art is not accepted (block 605), then the artist would be required to deliver one or more additional works or art in order to continue in the program (block 607). Assuming, however, that the fund accepts the work(s) or art (block 609), the artworks may be sent to personnel for framing and insurance purposes (block 611). The artwork(s) may be sent for storage (block 613). Following acceptance of one or more works of art (block 609), the fund issues the artist the same number (x) of warrants of a particular class (y) (block 615).

If the artist continues with the program (block 617), then the artist delivers the required number of works or art according to the specified schedule (block 619).

Assuming the artist continues with program, a determination is made whether the vesting period has passed with respect to any of the warrants the artist received (block 621). If the vesting period has passed, then the artist may convert the vested warrants into preferred shares of the corresponding class of the fund's stock (block 623). The artist (or other stockholder) may then collect future revenues distributed by the fund (block 625). As shown in the example of FIG. 5, revenues may be distributed by the fund in the form of dividends from year twenty through year fifty. At the end of the fund's lifetime (i.e., at the end of year fifty), the funds assets are liquidated and the revenue is distributed according to the amount of stock held by the artists and other parties.

If, at block 617, it is determined that the artist does not continue with the program, then a determination is made as to whether the vesting period has passed with respect to any of the warrants held by that artist (block 627). If the vesting period has not passed with respect to any of the warrants, then the warrants expire unexercised, and the artist's participation in the fund ends (block 629). Therefore, when an artist leaves the fund prematurely, she loses potential future dividends that she might have received in exchange for artworks contributed by her during the previous five years. On the other hand, if the vesting period has passed with respect to at least some of the warrants, then the artist may convert the vested warrants into preferred shares of the corresponding class of the fund's stock (block 631). The artist (or other stockholder) may then collect future revenues distributed by the fund based on the shares of stock (block 625).

As suggested above, all holders of the fund's preferred stock are entitled to receive a future revenue stream (e.g., dividends). In the particular example of FIG. 5, dividends are distributed according to a predetermined formula, starting at year twenty. Distributions continue through year fifty, at which time all remaining artworks in the fund are liquidated, and a final dividend is distributed. In some cases, the fund's management may have the authority to extend the lifetime of the fund by an additional period, such as two years.

The foregoing example illustrates how the business model may operate to provide retirement funds for participating artists, conditioned on the artists completing their obligation under the program. In some implementations, the fund's management may decide to offer a capital guarantee or other benefits (e.g., health or disability insurance) to encourage artists to join a particular fund. A specified amount (e.g., percentage) of the fund's revenues may be set aside for distribution to the participating artists based on their shares of preferred stock. The remaining revenues may be used for the benefit of the fund, including management of the fund and dividends to be distributed to third-party shareholders.

In the foregoing examples, if an artist leaves the fund prematurely, he may lose potential future pension payments. In various implementations, vesting conditions different from those discussed above may be imposed. Furthermore, amounts that are not distributed to a particular artist, for example, as a result of the artist's leaving the fund prematurely, may be divided according to a predetermined formula between the fund and the artists remaining in the program.

Various aspects of the system may be implemented in hardware, software or a combination of hardware and software. Circuitry, including dedicated or general purpose machines, such as computer systems and processors, may be adapted to execute machine-readable instructions to implement the techniques described above. Computer-executable instructions for implementing the techniques can be stored, for example, as encoded information on a computer-readable medium such as a magnetic floppy disk, magnetic tape, or compact disc read only memory (CD-ROM).

Other implementations are within the scope of the claims.

What is claimed is:

1. A method for the diversification of risk in connection with works of art, the method comprising:
   accepting from each of a plurality of artists one or more works of art to be pooled in a collective investment fund;
   issuing a financial instrument to each particular artist in consideration for one or more works of art contributed by that artist to the fund;
   generating revenues on behalf of the fund through commercialization of the works of art in the fund; and
   distributing a portion of the revenues among the artists participating in the fund according to vested interests in the financial instruments held by the artists, wherein each particular artist having a vested interest in one of the financial instruments is entitled to receive an amount of the revenues based on the collective commercial success of the works of art contributed to the fund by all the artists.

2. The method of claim 1 including receiving works of art for the fund from each artist according to a predetermined schedule.

3. The method of claim 1 wherein the financial instrument comprises a warrant that may be exercised by the particular artist after a specified vesting period.

4. The method of claim 3 wherein the warrant may be exercised by the particular artist after the vesting period only if the artist is still participating in the fund.

5. The method of claim 4 wherein the artist is deemed to still be participating in the fund only if the artist has contributed works of art to the fund according to a specified schedule.

6. The method of claim 3 wherein, upon exercising the warrant, the artist is entitled to a specified portion of future revenues distributed by the fund.

7. The method of claim 1 wherein distribution of revenue to the artists begins only after a specified period since the fund opened.

8. The method of claim 1 wherein the financial instrument comprises an equity instrument that entitles the artist to a specified portion of future revenues distributed by the fund.

9. The method of claim 1 wherein the works of art comprise visual works of art.

10. The method of claim 1 including having each work of art reviewed by a committee to determine whether the work of art should be accepted into the fund.

11. The method of claim 1 including transferring ownership of the works of art to an entity that manages the fund.

12. The method of claim 1 including issuing financial instruments, each of which represents one or more shares in the fund, to one or more entities other than the artists participating in the fund, wherein each share entitles the entity owning the financial instrument to a specified amount of future revenue generated by the fund.

13. The method of claim 1 including selecting artists to participate in the collective investment fund.

14. The method of claim 1 wherein a particular artist having a vested interest in one of the financial instruments is further entitled to receive an amount of the revenues based on the commercial success of the works of art contributed to the fund by that particular artist.

15. A system for distributing revenues in connection with works of art comprising:

a first database storing information about each of a plurality of artists and about one or more works of art accepted from each artist, wherein the works of art are pooled in a collective investment fund;

a second database storing information about financial instruments issued to each of the artists in consideration for one or more works of art contributed by the artists to the fund;

a third database storing information about revenues obtained on behalf of the fund through commercialization of the works of art in the fund; and a computer system coupled to each database, wherein the computer system is adapted to cause the distribution of a portion of the revenues among the artists participating in the fund according to vested interests in the financial instruments held by the artists, wherein each particular artist having a vested interest in one of the financial instruments is entitled to receive an amount of the revenues based on the collective commercial success of the works of art contributed to the fund by all the artists.

16. The system of claim 15 wherein the first database stores information about works of art received from each artist according to a predetermined schedule.

17. The system of claim 15 wherein each financial instrument comprises a warrant, and wherein the second database stores information about a vesting period after which the warrant may be exercised by a particular artist holding the warrant.

18. The system of claim 17 wherein the warrant may be exercised by the particular artist after the vesting period only if the particular artist is still participating in the fund.

19. The system of claim 18 wherein the artist is deemed to still be participating in the fund only if the particular artist has contributed works of art to the fund according to a specified schedule.

20. The system of claim 17 wherein the second database stores information about a specified portion of future revenues to be distributed by the fund to the particular artist upon exercising the warrant.

21. The system of claim 15 wherein the computer system is adapted to begin distribution of revenue to the artists only after a specified period since the fund opened.

22. The system of claim 15 wherein the second database stores information about financial instruments each of which comprises an equity instrument that entitles the artist to a specified portion of future revenues distributed by the fund.

23. The system of claim 15 wherein first database stores information about works of art that comprise visual works of art.

24. The system of claim 15 including a database that stores information about financial instruments, each of which represents one or more shares in the fund and which was issued to an entity other than an artist participating in the fund, wherein each share entitles the entity owning the financial instrument to a specified amount of future revenue generated by the fund.

25. A method for the diversification of risk in connection with works of art, the method comprising:

accepting from each of a plurality of artists one or more works of art to be pooled in a collective investment fund;

issuing a financial instrument to each particular artist in consideration for one or more works of art contributed by that artist to the fund;

generating revenues on behalf of the fund through commercialization of the works of art in the fund; and distributing a portion of the revenues among the artists participating in the fund according to vested interests in the financial instruments held by the artists, wherein each particular artist having a vested interest in one of the financial instruments is entitled to receive an amount of the revenues based on the collective commercial success of the works of art contributed to the fund by all the artists, wherein the portion of the revenues is distributed electronically among the artists participating in the fund.

26. A method for the diversification of risk in connection with works of art, the method comprising:

accepting from each of a plurality of artists one or more works of art to be pooled in a collective investment fund;

issuing a financial instrument to each particular artist in consideration for one or more works of art contributed by that artist to the fund;

generating revenues on behalf of the fund through commercialization of the works of art in the fund; and distributing a portion of the revenues among the artists participating in the fund according to vested interests in the financial instruments held by the artists, wherein each particular artist having a vested interest in one of the financial instruments is entitled to receive an amount of the revenues based on the collective commercial success of the works of art contributed to the fund by all the artists, wherein the method includes automated transfer of the portion of the revenues among the artists participating in the fund.

* * * * *